(12) United States Patent
Neveux et al.

(10) Patent No.: US 9,520,210 B1
(45) Date of Patent: Dec. 13, 2016

(54) SHIELDED TWISTED PAIR COMMUNICATION CABLES

(71) Applicant: Superior Essex Communications LP, Atlanta, GA (US)

(72) Inventors: Paul E Neveux, Atlanta, GA (US); Christopher W McNutt, Woodstock, GA (US)

(73) Assignee: Superior Essex Communications LP, Atlanta, GA (US)

( * ) Notice: Subject to any disclaimer, the term of this patent is extended or adjusted under 35 U.S.C. 154(b) by 34 days.

(21) Appl. No.: 13/917,164

(22) Filed: Jun. 13, 2013

(51) Int. Cl.
*H01B 11/08* (2006.01)

(52) U.S. Cl.
CPC .................................... *H01B 11/08* (2013.01)

(58) Field of Classification Search
CPC ......... H01B 11/02; H01B 11/04; H01B 11/06; H01B 7/295; H01B 9/003
USPC ............................. 174/113 R, 113 C, 114 R
See application file for complete search history.

(56) References Cited

U.S. PATENT DOCUMENTS

| | | | | |
|---|---|---|---|---|
| 1,883,269 A * | 10/1932 | Yonkers | ............... | H01B 11/002 174/113 C |
| 6,506,976 B1 | 1/2003 | Neveux | | |
| 7,214,883 B2 * | 5/2007 | Leyendecker | ......... | H01B 11/06 174/110 R |
| 7,999,184 B2 * | 8/2011 | Wiebelhaus | ......... | H01B 11/002 174/113 C |
| 2012/0301089 A1 * | 11/2012 | Camp, II | ............... | H01B 11/04 385/100 |
| 2013/0014972 A1 | 1/2013 | Wiebelhaus | | |

OTHER PUBLICATIONS

Office Action mailed Jan. 15, 2015, for U.S. Appl. No. 14/057,242.

* cited by examiner

*Primary Examiner* — Timothy Thompson
*Assistant Examiner* — Paul McGee, III

(57) ABSTRACT

Shielded twisted pair communication cables are described. A cable may include at least one twisted pair of insulated conductors, and an outer circumference may be defined by the twisted pair along a longitudinal length of the cable. A shield may be formed around the twisted pair, and a jacket may be formed around the shield. Additionally, a dielectric film may separate the insulated conductors of the twisted pair, and the dielectric film may extend beyond the outer circumference of the twisted pair and contact the shield.

19 Claims, 5 Drawing Sheets

SHIELDED TWISTED PAIR COMMUNICATION CABLES

TECHNICAL FIELD

Embodiments of the disclosure relate generally to twisted pair communication cables and, more particularly, to shielded twisted pair communication cables incorporating dielectric films or separators to maintain a separation distance between one or more twisted pairs and one or more shielding elements.

BACKGROUND

A wide variety of different types of communication cables and composite cables incorporate twisted pair conductors. Many cable constructions incorporate shielding in order to limit interference on the twisted pairs, including crosstalk between twisted pairs and external interference. Shields are typically formed from metallic material that is continuous along a length of the cable. More recently, discontinuous shields including metallic segments or patches have been incorporated into cables. Additionally, in some cables, individual shields are provided for twisted pairs. In other cables, shields or screens are applied to a collection of twisted pairs. These screens are typically formed as foil screens or braided screens.

When a shield is situated in close proximity to twisted pair conductors, the shield can have a detrimental effect on the electrical performance of the twisted pair(s). Particularly, the shield can lead to increased attenuation. In order to minimize attenuation losses due to the presence of one or more shields, the insulation of the twisted pair conductors is typically increased or thickened. The increased insulation increases the size of the twisted pair(s), as well as the overall size and cost of the cable. As a result of the size increases, the cable will likely be more difficult to handle and install. Additionally, the increased insulation may have detrimental effects on other electrical parameters of the cable, thereby requiring further optimization. Accordingly, there is an opportunity for improved shielded twisted pair communication cables. Additionally, there is an opportunity for shielded twisted pair communication cables that incorporate dielectric films or separators to maintain a separation distance between one or more twisted pairs and one or more shielding elements

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
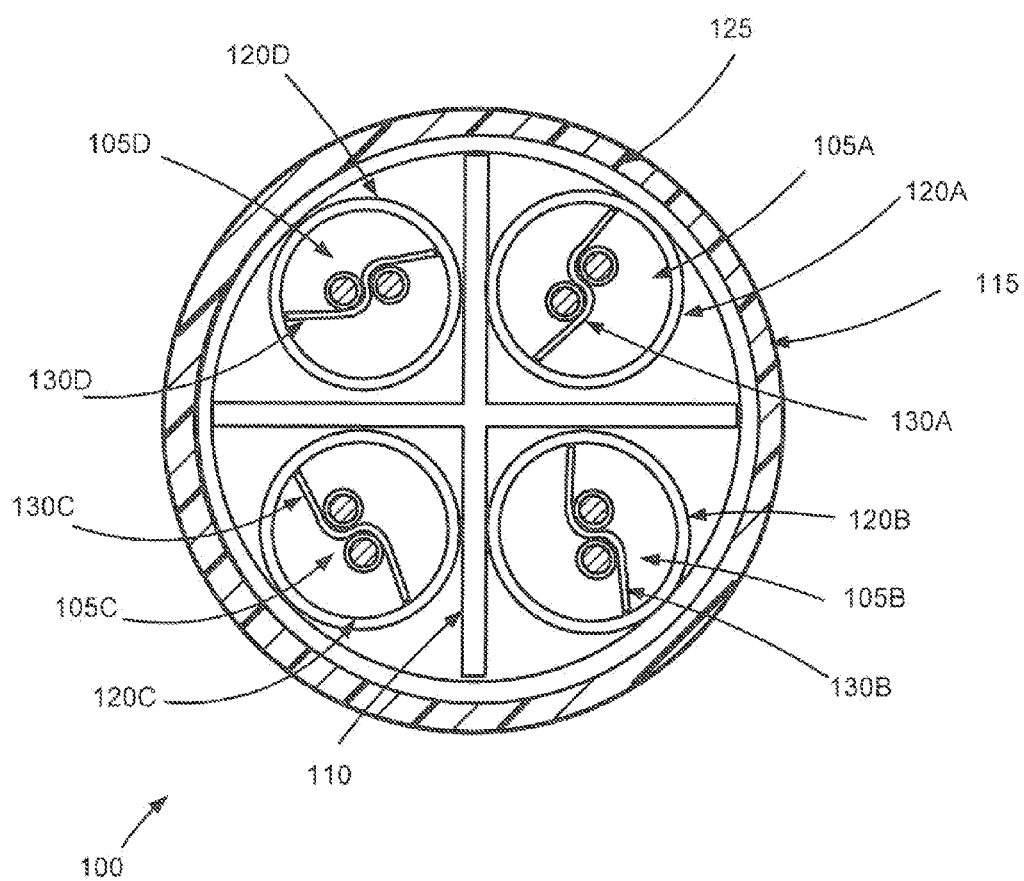
FIGS. 1-4 are cross-sections of example shielded twisted pair cables, according to illustrative embodiments of the disclosure.

Various embodiments of the present disclosure are directed to shielded twisted pair communication cables incorporating dielectric films that maintain separation between the twisted pairs and cable shielding elements. In accordance with one example embodiment, a cable may include one or more twisted pairs of conductors. In certain embodiments, at least one twisted pair may include a dielectric film or dielectric separator positioned between the individual conductors of the twisted pair. For example, a dielectric film may be helically woven between the individual conductors of the twisted pair. Additionally, according to an aspect of the disclosure, the dielectric film may extend beyond the twisted pair. In other words, the dielectric film may extend beyond an outer periphery or outer circumference taken up by the twisted pair. In this regard, the dielectric film may function as a buffer that maintains separation between the twisted pair and one or more other components of the cable, such as a shield wrapped around one or more twisted pairs and/or a filler or separator that assists in maintaining a desired twisted pair configuration.

A dielectric film may be formed from a wide variety of suitable materials as desired in various embodiments, such as one or more suitable polymeric materials. Additionally, in various embodiments, the dielectric film may extend beyond the twisted pair along a single edge (e.g., along one edge of the dielectric film in a width direction) or along multiple edges. A portion of the dielectric film that extends beyond the twisted pair may also have a wide variety of desired lengths, such as a length that is less than or approximately equal to the diameter of one of the conductors included in the twisted pair. Additionally, as desired in various embodiments, an extending portion of the dielectric film may include a curved, folded, or otherwise shaped end portion designed to engage another component of the cable. For example, an extending portion of the dielectric film may include an L-shaped or T-shaped end portion designed to engage a shield and assist in maintaining a desired separation between the twisted pair and the shield.

As a result of providing dielectric films or separation elements that extend beyond the twisted pairs, a suitable separation distance may be maintained between one or more twisted pairs and one or more shield components. For example, a suitable separation distance may be maintained between a twisted pair and a shield that is wrapped around the twisted pair. As another example, a suitable separation distance may be maintained between a twisted pair and a filler or separator that is positioned between two or more twisted pairs. Additionally, the separation distance may be filled with air or another gas having a relatively low dielectric constant, thereby decreasing attenuation and/or electrical losses within the cable. Further, the use of dielectric films or separation elements may permit the size of cables to be reduced relative to conventional shielded cables. Additionally, the thickness of twisted pair insulation may be reduced, thereby resulting in reduced cable thickness and/or lower cable costs. By contrast, conventional shielded cables typically utilize solid and/or foamed polymers as twisted pair insulation in order to separate twisted pair conductors from a shield. These materials often increase overall cable size and cost, while providing a dielectric that is less effective than air.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIG. 1, a cross-section of an example cable 100 that may be utilized in various embodiments is illustrated. The cable 100 is illustrated as a communications cable; however, other types of cables may be utilized. The cable 100 may include a wide variety of suitable transmission media, such as one or more twisted pairs, one or more optical fibers, one or more coaxial cables, and/or one or more power conductors. As illustrated in FIG. 1, the cable 100 may include a plurality of twisted pairs of electrical conductors 105A-D. In other embodiments, the cable 100 may include a combination of twisted pairs and one or more other types of transmission media (e.g., optical fibers, etc).

According to an aspect of the disclosure, the cable 100 may also include one or more shielding elements. Shielding elements may include, for example, shield layers wrapped around or enclosing one or more of the twisted pairs 105A-D and/or a separation filler 110 incorporating shielding material and positioned between one or more twisted pairs. As explained in greater detail below, at least one of the twisted pairs may include a dielectric film positioned between the individual conductors of the twisted pair and extending beyond the twisted pair. The dielectric film may maintain a suitable distance between the twisted pair and one or more shielding elements. Additionally, an outer jacket 115 may be formed around the twisted pairs 105A-D and the shielding elements.

As shown in FIG. 1, each twisted pair 105A-D may be individually shielded in certain embodiments. For example, a first shield 120A or shield layer may be provided for a first twisted pair 105A, a second shield 120B may be provided for a second twisted pair 105B, a third shield 120C may be provided for a third twisted pair 105C, and a fourth shield 120D may be provided for a fourth twisted pair 105D. In alternative embodiments, shield layers may be provided for any desired groupings of twisted pairs. Additionally, in certain embodiments, an external shield 125 may be provided that encompasses all of the twisted pairs 105A-D and/or other cable components. For example, in certain embodiments, an external shield 125 may be positioned between the twisted pairs 105A-D and the outer jacket 115. In other embodiments, an external shield may be embedded or incorporated into the outer jacket 115. Indeed, in various embodiments, any desired shield, combinations of shields, and/or groups of shielding components may be utilized. A few non-limiting examples of shielding arrangements are illustrated in FIGS. 1-4.

Any number of twisted pairs may be utilized as desired in the cable 100. As shown in FIG. 1, the cable 100 may include four twisted pairs 105A, 105B, 105C, 105D. As desired, the twisted pairs may be twisted or bundled together and/or suitable bindings may be wrapped around the twisted pairs. In other embodiments, multiple grouping of twisted pairs may be incorporated into a cable. As desired, each grouping may be twisted, bundled, and/or bound together. Further, in certain embodiments, the multiple groupings may be twisted, bundled, or bound together. Additionally, embodiments of the disclosure may be utilized in association with horizontal cables, vertical cables, flexible cables, equipment cords, cross-connect cords, plenum cables, riser cables, or any other appropriate cables.

Each twisted pair (referred to generally as twisted pair 105 or collectively as twisted pairs 105) may include two electrical conductors, each covered with suitable insulation. As desired, each of the twisted pairs may have the same twist lay length or alternatively, at least two of the twisted pairs may include a different twist lay length. For example, each twisted pair 105A-D may have a different twist rate. The different twist lay lengths may function to reduce crosstalk between the twisted pairs. As desired, the differences between twist rates of twisted pairs 105 that are circumferentially adjacent one another (for example the twisted pair 105A and the twisted pair 105B) may be greater than the differences between twist rates of twisted pairs 105 that are diagonal from one another (for example the twisted pair 105A and the twisted pair 105C). As a result of having similar twist rates, the twisted pairs 105 that are diagonally disposed can be more susceptible to crosstalk issues than the twisted pairs 105 that are circumferentially adjacent; however, the distance between the diagonally disposed pairs may limit the crosstalk. Thus, the different twist lengths and arrangements of the pairs can help reduce crosstalk among the twisted pairs 105. Additionally, in certain embodiments, each of the twisted pairs 105A-D may be twisted in the same direction (e.g., clockwise, counter clockwise). In other embodiments, at least two of the twisted pairs 105A-D may be twisted in opposite directions.

The electrical conductors may be formed from any suitable electrically conductive material, such as copper, aluminum, silver, annealed copper, gold, or a conductive alloy. The insulation may include any suitable dielectric materials and/or combination of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PEA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. In certain embodiments, the insulation may be formed from multiple layers of a plurality of suitable materials. In other embodiments, the insulation may be formed from one or more layers of foamed material. As desired, different foaming levels may be utilized in accordance with twist lay length to result in insulated twisted pairs having an equivalent or approximately equivalent overall diameter. In certain embodiments, the insulation may additionally include other materials, such as a flame retardant material and/or a smoke suppressant material.

Each twisted pair 105A-D can carry data or some other form of information, for example in a range of about one to ten Giga bits per second ("Gbps") or another appropriate frequency, whether faster or slower. In certain embodiments, each twisted pair 105A-D supports data transmission of about two and one-half Gbps (e.g. nominally two and one-half Gbps), with the cable 100 supporting about ten Gbps (e.g. nominally ten Gbps). In certain embodiments, each twisted pair 105A-D supports data transmission of about ten Gbps (e.g. nominally ten Gbps), with the cable 100 supporting about forty Gbps (e.g. nominally forty Gbps).

The jacket 115 may enclose the internal components of the cable 100, seal the cable 100 from the environment, and provide strength and structural support. The jacket 115 may be formed from a wide variety of suitable materials and/or combinations of materials, such as one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or a combination of any of the above materials. The jacket 115 may be formed as a single layer or, alternatively, as multiple layers. In certain embodiments, the jacket 115 may be formed from one or more layers of foamed material. As desired, the jacket 115 can include flame retardant and/or smoke suppressant materials. Additionally, the jacket 115 may include a wide variety of suitable shapes and/or dimensions. For example, the jacket 115 may be formed to result in a round cable or a cable having an approximately circular cross-section; however, the jacket 115 and internal components may be formed to result in other desired shapes, such as an elliptical, oval, or rectangular shape. The jacket 115 may also have a wide variety of dimensions, such as any suitable or desirable outer diameter and/or any suitable or desirable wall thickness. In various embodiments, the jacket 115 can be characterized as an outer jacket, an outer sheath, a casing, a circumferential cover, or a shell.

In certain embodiments, one or more shield layers can be disposed between the jacket 115 and one or more additional cable components. For example, an external shield 125 may be disposed between the jacket 115 and the twisted pairs 105. As another example, a plurality of shield layers, such as individual twisted pair shields, may be disposed between the jacket and the twisted pairs. In other embodiments, a shield layer (or shielding material) may be incorporated or embedded into the jacket 115 or placed on the outside of the jacket 115. In certain embodiments, a shield layer may incorporate electrically conductive material in order to provide electrical shielding for one or more cable components. Further, in certain embodiments, the cable 100 may include a separate, armor layer (e.g., a corrugated armor, etc.) for providing mechanical protection.

An opening enclosed by the jacket 115 may be referred to as a cable core, and the twisted pairs 105A-D may be disposed within the cable core. In certain embodiments, the cable core may be filled with a gas such as air (as illustrated) or alternatively a gelatinous, solid, powder, moisture absorbing material, water-swellable substance, dry filling compound, or foam material, for example in interstitial spaces between the twisted pairs 105A-D. Other elements can be added to the cable core as desired, for example one or more optical fibers, additional electrical conductors, additional twisted pairs, and/or strength members, depending upon application goals.

In certain embodiments, the cable 100 may also include a separator 110 or filler configured to orient and or position one or more of the twisted pairs 105A-D. The orientation of the twisted pairs 105A-D may provide beneficial signal performance. As desired in various embodiments, the separator 110 may be formed in accordance with a wide variety of suitable dimensions, shapes, or designs. For example, a rod-shaped separator, a flat tape separator, a flat separator, an X-shaped or cross-shaped separator, a T-shaped separator, a Y-shaped separator, a J-shaped separator, an L-shaped separator, a diamond-shaped separator, a separator having any number of spokes extending from a central point, a separator having walls or channels with varying thicknesses, a separator having T-shaped members extending from a central point or center member, a separator including any number of suitable fins, and/or a wide variety of other shapes may be utilized. In certain embodiments, material may be cast or molded into a desired shape to form the separator 110. In other embodiments, a tape may be formed into a desired shape utilizing a wide variety of folding and/or shaping techniques. For example, a relatively flat tape separator may be formed into an X-shape or cross-shape as a result of being passed through one or more dies.

In certain embodiments, the separator 110 may be continuous along a length of the cable 100. In other embodiments, the separator 110 may be non-continuous or discontinuous along a length of the cable 100. In other words, the separator 110 may be separated, segmented, or severed in a longitudinal direction such that discrete sections or portions of the separator 110 are arranged longitudinally (e.g., end to end) along a length of the cable 100. Use of a non-continuous or segmented separator may enhance the flexibility of the cable 100, reduce an amount of material incorporated into the cable 100, and/or reduce the cable cost.

In the event that a discontinuous separator 110 is utilized, the various portions or segments of the separator 110 may include a wide variety of different lengths and/or sizes as desired. Additionally, in certain embodiments, each of the separator segments or portions may have lengths that are approximately equal. In other embodiments, various portions of the separator 110 may have varying lengths. These varying lengths may follow an established pattern or, alternatively, may be incorporated into the cable 100 at random. In certain embodiments, gaps or spaces may be present in the longitudinal direction of the cable 100 between two consecutive or adjacent portions of the separator 110. In other embodiments, adjacent portions of the separator 110 may be permitted to contact one another. In the event that adjacent portions are permitted to contact one another, relatively consistent and predictable stiffness (and in certain embodiments shielding) may be provided along a length of a cable; however, the discontinuity of the separator 110 may allow greater flexibility. In yet other embodiments, gaps may be present between some adjacent portions of the separator 110 while other adjacent portions are permitted to contact one another. In certain embodiments, the sizes of gaps or spaces between consecutive portions of the separator 110 may be approximately equal along a length of the cable 100. In other embodiments, the sizes of the gaps may be varied in accordance with a pattern or in a random manner. Additionally, a wide variety of suitable gap sizes may be utilized as desired in various embodiments. In certain embodiments, the gaps may be small enough to prevent the twisted pairs 105A-D from contacting each other in the interstitial spaces between portions of the separator 110.

The separator 110 may be formed from a wide variety of suitable materials as desired in various embodiments. For example, the separator 110 and/or various separator segments can include paper, metals, alloys, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or any other suitable material or combination of materials. As desired, the separator 110 may be filled, unfilled, foamed, un-foamed, homogeneous, or inhomogeneous and may or may not include additives (e.g., flame retardant and/or smoke suppressant materials).

In certain embodiments, each segment or portion of the separator 110 may be formed from similar materials. In other embodiments, a separator 110 may make use of alternating materials in adjacent portions (whether or not a gap is formed between adjacent portions). For example, a first portion or segment of the separator 110 may be formed from a first set of one or more materials, and a second portion or segment of the separator 110 may be formed from a second set of one or more materials. As one example, a relatively flexible material may be utilized in every other portion of a separator 110. As another example, relatively expensive flame retardant material may be selectively incorporated into desired portions of a separator 110. In this regard, material costs may be reduced while still providing adequate flame retardant qualities.

According to an aspect of the disclosure, at least one shielding element may be incorporated into the cable 100. Shielding elements may include shield layers, such as individual twisted pair shields 120A-D, shields formed around groups of twisted pairs, and/or an external shield 125. Additionally or alternatively, shielding elements may include one or more separators 110 that incorporate shielding material. A wide variety of different combinations of shielding elements may be utilized as desired in various embodiments of the disclosure.

A shield layer, such as an external shield 125 or an individual twisted pair shield 120A-D, may be formed from a wide variety of suitable materials and/or utilizing a wide variety of suitable techniques. In certain embodiments, a shield layer may be formed as an electrically conductive layer (e.g., a metallic layer), as an electrically conductive foil, or as a braided shield layer. For example, a relatively solid metallic shield layer may be utilized to form a continuous shield. In operation, the shield layer may be grounded when the cable 100 is deployed. In other embodiments, a shield layer may be formed as a plurality of layers. For example, electrically conductive material may be formed on a dielectric substrate to form a shield layer. As desired, the electrically conductive material may include discrete patches of material, thereby resulting in a discontinuous shield. In yet other embodiments, a shield layer may be formed from or may include a semi-conductive material. Additionally, in certain embodiments, a shield layer may be formed as a continuous layer along a longitudinal length of the cable 100. In other embodiments, a shield layer may include a plurality of separate segments or components along a longitudinal length of the cable 100. As desired, one or more adjacent shield layer components may overlap one another along shared longitudinal edges. Alternatively, spaces or gaps may be present between certain shield layer components.

In certain embodiments, a separator 110 (or various separator segments) may include or incorporate electrically conductive material that functions as a shield (or partial shield). For example, a separator 110 may include electrically conductive material, such as one or more metallic patches (or other suitable conductive material) formed on or adhered to a dielectric substrate or base. As another example, a separator 110 may include electrically conductive material embedded into or impregnated into a dielectric material. As yet another example, a separator 110 may include relatively solid sections of electrically conductive material, such as discrete electrically conductive segments incorporated into a segmented separator or electrically conductive sections incorporated into a continuous separator (or various separator segments of a discontinuous separator).

Similar to a shield layer, a separator 110 may utilize a wide variety of different configurations of electrically conductive material in order to provide shielding. In certain embodiments, electrically conductive material incorporated into a separator 110 (or separator segment) may be continuous or relatively continuous along as length of the separator 110. In other embodiments, discontinuous patches of electrically conductive material may be incorporated into the separator 110 and/or various separator segments. In yet other embodiments, semi-conductive material may be incorporated into the separator 110.

As set forth above, a wide variety of different types of shielding elements and/or combinations of shielding elements may be incorporated into a cable 100. These shielding elements may utilize a wide variety of different materials and/or have a wide variety of suitable configurations. For example, a wide variety of suitable electrically conductive materials or combination of materials may be utilized in a shielding element including, but not limited to, metallic material (e.g., silver, copper, annealed copper, gold, aluminum, etc), metallic alloys, conductive composite materials, etc. Indeed, suitable electrically conductive materials may include any material having an electrical resistivity of less than approximately $1 \times 10^{-7}$ ohm meters at approximately 20° C., such as an electrical resistivity of less than approximately $3 \times 10^{-8}$ ohm meters at approximately 20° C. In the event that discontinuous patches or sections of electrically conductive material are utilized, the patches may have any desired dimensions, such as any desired lengths and/or thicknesses. Further, any desired gaps or spaces may be positioned between adjacent patches. Further, electrically conductive material incorporated into a shield element may have a wide variety of suitable arrangements and/or shapes.

As desired, a wide variety of suitable techniques and/or processes may be utilized to form a shield element. For example, a separator 110 may be formed by extruding, poltruding, or otherwise forming a base dielectric layer, and electrically conductive material may then be applied or adhered to the base material. In other embodiments, electrically conductive material may be injected into the base material. In yet other embodiments, dielectric material may be formed or extruded over electrically conductive material to form a separator 110. As desired, a base layer may have a substantially uniform composition and/or may be made of a wide range of materials. Additionally, the base layer may be fabricated in any number of manufacturing passes, such as a single manufacturing pass. Further, the base layer may be foamed, may be a composite, and/or may include one or more strength members, fibers, threads, or yarns. As desired, flame retardant material, smoke suppressants, and/or other desired substances may be blended or incorporated into the base layer. Additionally, as desired, the base layer may be hollow to provide a cavity that may be filled with air or some other gas, gel, fluid, moisture absorbent, water-swellable substance, dry filling compound, powder, one or more optical fibers, one or more metallic conductor (e.g., a drain wire, etc.), shielding, or some other appropriate material or element. Indeed, a wide variety of suitable techniques may be utilized to incorporate electrically conductive material into a separator 110. In other embodiments, a separator 110 may be substantially free of electrically conductive material. For example, a separator 110 may be formed from dielectric material.

In certain embodiments, a shielding element, such as a shield layer (e.g., an external shield layer 125, an individual twisted pair shield 120A-D, etc.) or separator 110, may be formed as a tape that includes both a dielectric layer (e.g., plastic, polyester, polyethylene, polypropylene, fluorinated ethylene propylene, polytetrafluoroethylene, polyimide, or some other polymer or dielectric material that does not ordinarily conduct electricity etc.) and an electrically conductive layer (e.g., copper, aluminum, silver, an alloy, etc.). As one example, a separate dielectric layer and electrically conductive layer may be bonded, adhered, or otherwise joined (e.g., glued, etc.) together to form the shielding element. In other embodiments, electrically conductive material may be formed on a dielectric layer via any number of suitable techniques, such as the application of metallic ink or paint, liquid metal deposition, vapor deposition, welding, heat fusion, adherence of patches to the dielectric, etching of patches from a metallic sheet, or selective laser removal of metallic material to form patches. In certain embodiments, the conductive patches can be over-coated with an electrically insulating film, such as a polyester coating. Additionally, in certain embodiments, an electrically conductive layer may be sandwiched between two dielectric layers. In other embodiments, at least two electrically conductive layers may be combined with any number of suitable dielectric layers to form the shielding element. Indeed, any number of suitable layers of material may be utilized to form a tape which may be used as a shielding element.

As set forth above, a shielding element may include any number of patches of electrically conductive material. For example, a single electrically conductive patch may form a relatively continuous shield along a longitudinal length of a shielding element. Alternatively, a plurality of electrically conductive patches may be provided that are electrically isolated from one another to form a discontinuous shield. The electrically isolation may result from gaps or spaces between electrically conductive patches, such as gaps of dielectric material and/or air gaps (e.g., gaps between adjacent separator segments, etc.). The respective physical separations between the patches may impede the flow of electricity between adjacent patches.

The electrically conductive patches or sections may also include a wide variety of suitable dimensions, for example, any suitable lengths in the longitudinal direction, any suitable gap lengths or spaces between adjacent patches, and/or any suitable thicknesses. Additionally, a plurality of patches may be formed in accordance with a pattern or in random fashion. As desired, the dimensions can be selected to provide electromagnetic shielding over a specific band of electromagnetic frequencies or above or below a designated frequency threshold. In certain embodiments, each patch may have a length of about one meter to about ten meters or greater (e.g., a length of up to 100 meters, etc.), although lengths of less than one meter (e.g., lengths of about 1.5 to about 2 inches, etc.) may be utilized. For example, the patches may have a length in a range of about one to ten meters and isolation spaces in a range of about one to five millimeters. In various embodiments, the patches may have a length of about 0.5, 0.75, 1.0, 1.5, 2.0, 2.5, 3.0, 3.5, 4.0, 4.5, or 5.0 meters or in a range between any two of these values; and the isolation spaces can have a length of about 0.5, 1.0, 1.5, 2.0, 2.5, 3.0, 3.5, or 4 millimeters or in a range between any two of these values. Additionally, in certain embodiments, the patches may be formed as first patches (e.g., first patches on a first side of a dielectric material), and second patches may be formed on an opposite side of the dielectric material (or on another dielectric material). For example, second patches may be formed to correspond with the gaps or isolation spaces between the first patches.

In certain embodiments, a dielectric portion of a tape (e.g., a tape that is formed into a desired shape to form a separator 110, a tape used to form a shield layer, etc.) may have a thickness of about 1 to about 5 mils (thousandths of an inch) or about 25 to about 125 microns. In the event that a non-tape separator is utilized, a dielectric portion or base portion of the separator may have any suitable dimensions, such as any suitable thickness, diameter, or circumference. Each electrically conductive patch may include a coating of metal having any desired thickness, such as a thickness of about 0.5 mils (about 13 microns) or greater. In many applications, signal performance benefits from a thickness that is greater than about 2 mils, for example in a range of about 2.0 to about 2.5 mils, about 2.0 to about 2.25 mils, about 2.25 to about 2.5 mils, about 2.5 to about 3.0 mils, or about 2.0 to about 3.0 mils. Indeed, with a thickness of less than about 1.5 mils, negative insertion loss characteristics may be present on the cable 100. In other embodiments, thicker portions of electrically conductive material may be utilized. For example, relatively solid portions of electrically conductive material may be positioned between dielectric ends to form a separator. A wide variety of other configurations including different thicknesses will also be appreciated.

In one example embodiment, patches of electrically conductive material may be between approximately two and approximately five meters in length. In another example embodiment, patches may be between approximately one and approximately three meters in length. For example, each patch may be at least two meters in length, and a relatively small isolation gap (e.g., 4 millimeters or less, about $\frac{1}{16}$ of an inch, etc.) may be formed between adjacent patches. In the event that relatively long patches are utilized, such as patches that are approximately two meters in length or greater, a return loss spike for the cable 100 may be formed within the operating frequency of the cable 100. However, the amplitude of the return loss spike may satisfy electrical performance requirements for the cable 100 (i.e., fall within acceptable limits), thereby permitting higher signal frequencies to be supported by the cable 100. In the event that smaller patches are utilized (e.g., patches less than approximately one meter in length), a return loss spike may be shifted outside of the operating range of the cable 100.

In certain embodiments, the electrically conductive patches incorporated into a shielding element may have a spiral direction that is opposite the twist direction of the pairs 105A-D. For example, the cable core and the four twisted pairs 105A-D may be collectively twisted about a longitudinal axis of the cable 100 in a common direction. The twist direction of the pairs 105A-D may be opposite the spiral direction of the patches. That is, if the core is twisted in a clockwise direction, then the patches may spiral in a counterclockwise direction. If the core is twisted in a counterclockwise direction, then the conductive patches may spiral in a clockwise direction. Thus, cable lay opposes the direction of the patch spiral. The opposite directions may provide an enhanced level of shielding performance. In other embodiments, the patches may have a spiral direction that is the same as the twist direction of the pairs 105A-D. In yet other embodiments, patches formed on a shielding element may have an opposite spiral direction than patches formed on a shield layer.

Figure 4:
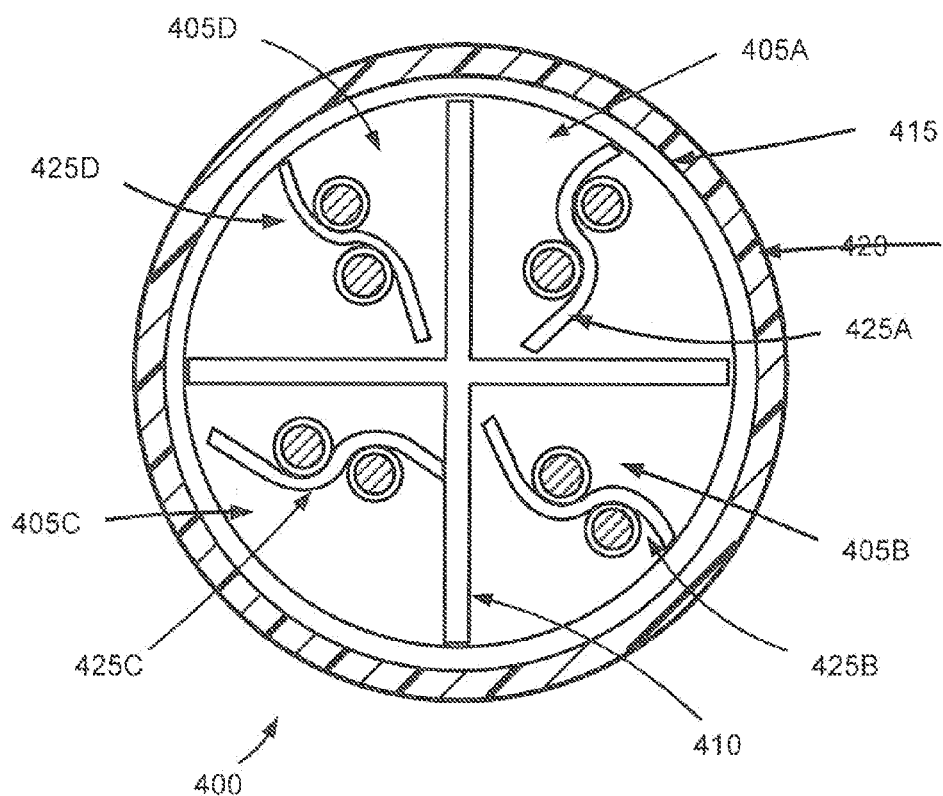

In certain embodiments and as illustrated in FIG. 4, both a separator 110 and an external shield 120 may be incorporated into a cable. For example, a separator 110 may be positioned between a multitude of twisted pairs 105, and an external shield 120 may circumscribe the twisted pairs 105 (or a desired grouping of one or more twisted pairs). Further, both the separator 110 and the external shield 120 may include one or more patches of electrically conductive material. In this regard, the separator 110 may provide for shielding between the twisted pairs, and the external shield 120 may shield the twisted pairs from external signals. Further, in certain embodiments, the spaces between adjacent patches in the separator 110 may be dimensioned to align with corresponding spaces in the shield 120. As desired, the gaps may be dimensioned to be large enough to permit twisting and bending of the cable 100 while still permitting proper alignment of the separator 110 and shield 120. In other embodiments, patches on the shield 120 may be dimensioned to cover gaps or spaces in the separator 110. As a result of utilizing both a separator 110 and shield 120, the performance of the cable 100 may be similar to a cable in which each of the twisted pairs 105 is individually shielded (i.e., a shielded twisted pair ("STP") cable). In other words, the cable 100 utilizing both a separator and an external shield may function as an alternative to conventional STP cables. However, the cable 100 may be easier to terminate by a technician.

According to an aspect of the disclosure, a dielectric film, dielectric separator, or demarcator may be positioned between the individual conductive elements or electrical conductors of one or more of the twisted pairs 105A-D. As shown in FIG. 1, a respective dielectric film is positioned between the individual conductors of each of the twisted pairs 105A-D. For example, a first dielectric film 130A is positioned between the conductors of the first twisted pair 105A, a second dielectric film 130B is positioned between the conductors of the second twisted pair 105B, a third dielectric film 130C is positioned between the conductors of the third twisted pair 105C, and a fourth dielectric film 130D is positioned between the conductors of the fourth twisted pair 105D. In other embodiments, only a portion of the twisted pairs 105A-D may include a dielectric film positioned between the individual conductors.

In certain embodiments, a dielectric film or separator (generally referred to as dielectric film 130) may be woven helically between the individual conductors or conductive elements of a twisted pair (generally referred to as twisted pair 105). In other words, the dielectric film 130 may be helically twisted with the conductors of the twisted pair 105 along a longitudinal length of the cable 100. As desired, the dielectric film 130 may maintain spacing between the individual conductors of the twisted pair 130. In certain embodiments, the dielectric film 130 may include a lengthwise direction or length dimension that extends along the longitudinal length of the cable 100 and a widthwise direction or width dimension transverse to the lengthwise direction. Additionally, in certain embodiments, the dielectric film 130 may include first and second edges along the width dimension.

Additionally, in accordance with an aspect of the disclosure, at least one of the dielectric films 130A-D may extend beyond its respective twisted pair 105A-D. For example, at least one of the first and second edges of a dielectric film 130 may extend beyond a twisted pair 105. As shown in FIG. 1, a dielectric film 130 may extend beyond a twisted pair 105 along both edges of the dielectric film. Along a longitudinal length of the cable 100, the twisted pair 105 may occupy an area having an approximately circular cross-section. At any given cross-sectional point, the individual conductors do not occupy an area having an overall circular cross-section; however, the twisting of the conductors along the longitudinal length results in the occupation of an approximately circular cross-sectional area. In certain embodiments, the dielectric film 130 may extend beyond an outer periphery or outer circumference taken up by the twisted pair 105. In other words, the dielectric film 130 may extend beyond the cross-sectional area occupied by the twisted pair 105. In this regard, the dielectric film 130 may function as a buffer that maintains separation between the twisted pair 105 and one or more other components of the cable 100, such as one or more shielding elements (e.g., a shield layer, a separator 110, etc.).

A dielectric film 130 may be formed from a wide variety of suitable materials and/or utilizing a wide variety of suitable techniques. For example, the dielectric film 130 may be formed from paper, various plastics, one or more polymeric materials, one or more polyolefins (e.g., polyethylene, polypropylene, etc.), one or more fluoropolymers (e.g., fluorinated ethylene propylene ("FEP"), melt processable fluoropolymers, MFA PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins (e.g., flame retardant polyethylene, ("FRPE"), flame retardant polypropylene ("FRPP"), a low smoke zero halogen ("LSZH") material, etc.), polyurethane, neoprene, cholorosulphonated polyethylene, flame retardant PVC, low temperature oil resistant PVC, flame retardant polyurethane, flexible PVC, or any other suitable material or combination of materials. In certain embodiments, a dielectric film 130 may be formed as a single layer. In other embodiments, a dielectric film 130 may include multiple layers. In yet other embodiments, a dielectric film 130 may be formed from one or more layers of foamed material.

Additionally, in certain embodiments, a dielectric film 130 may be formed as a continuous layer along a longitudinal length of the cable 100. In other embodiments, a dielectric film 130 may include a plurality of separate segments or components along a longitudinal length of the cable 100. For example, separate or discrete sections of dielectric film material may be helically woven between the individual conductors of a twisted pair 105 in regular intervals.

A dielectric film 130 may have any suitable thickness as desired in various embodiments. For example, a dielectric film 130 may have a thickness between approximately one half the thickness of the twisted pair insulation and approximately two times the thickness of the twisted pair insulation. As another example, a dielectric film 130 may have a thickness that provides sufficient strength to maintain a desired separation between the twisted pair and a shielding element when a certain compressive force is exerted on the cable 100. Additionally, in certain embodiments, the thickness of a dielectric film 130 may be substantially uniform throughout the dielectric film 130. In other embodiments, the thickness of the dielectric film 130 may vary. For example, a portion of the dielectric film 130 situated between the individual conductors of a twisted pair 105 may have at first thickness, and a portion of the dielectric film 130 extending beyond the twisted pair 105 may have a second thickness, such as a second thickness greater than the first thickness.

A dielectric film 130 may also have a wide variety of suitable widths as desired in various embodiments. In various embodiments, the dielectric film 130 may extend beyond the twisted pair along a single edge (e.g., along one edge of the dielectric film 130 in a width direction) or along multiple edges (e.g., along both edges of the dielectric film 130 in a width direction). Accordingly, a width of a dielectric film 130 may be sized to permit one or both edges of the dielectric film 130 to extend beyond the twisted pair 105. Additionally, a portion of a dielectric film 130 that extends beyond the twisted pair may have a wide variety of desired lengths. In certain embodiments, the length of a portion or edge of a dielectric film 130 extending beyond the twisted pair 105 may be less than or approximately equal to the diameter of one of the conductors included in the twisted pair 105. As an example, if each conductor of the twisted pair 105 has a diameter of approximately 0.04 inches, then the dielectric film 130 may extend up to approximately 0.04 inches beyond the twisted pair. Other lengths of extension may be utilized as desired, such as extension lengths approximately equal to 1.5 times the diameter of a twisted pair conductor, extension lengths approximately equal to 2 times the diameter of a twisted pair conductor, or extension lengths greater than 2 times the diameter of a twisted pair conductor.

In certain embodiments, a dielectric film 130 may extend beyond a twisted pair 105 along approximately the entire length of an edge (or multiple edges) of the dielectric film 130. In other embodiments, a dielectric film 130 may extend beyond a twisted pair 105 along portions of an edge (or multiple edges), such as evenly spaced portions or segments that extend beyond the twisted pair. In yet other embodiments, certain portions of a dielectric film 130 may extend beyond the twisted pair 105 along a first edge while other portions of the dielectric film 130 extend beyond the twisted pair 105 along a second edge. For example, extending portions may alternate between the first edge and the second edge.

Additionally, as desired in various embodiments, an extending portion of a dielectric film 130 (e.g., an extending edge, etc.) may include a curved, folded, or otherwise shaped end portion designed to engage another component of the cable 100. For example, an extending portion of the dielectric film may include an L-shaped, T-shaped, or other suitable end portion designed to engage a shielding element (e.g., a shield, a separator, etc.) and assist in maintaining a suitable separation between the twisted pair 105 and the shielding element. In certain embodiments the dielectric film 130 may be folded along an edge or a portion of an edge in order to form a shaped end portion. In other embodiments, a dielectric film 130 may be folded along an edge or a portion of an edge to create a thicker extending portion. For example, the dielectric portion 130 may be folded over itself back towards the twisted pair 105. A few non-limiting examples of dielectric films are discussed in greater detail below with reference to FIGS. 5A-5D.

A wide variety of suitable techniques may be utilized as desired to incorporate a dielectric film 130 into a cable 100. For example, a dielectric film 130 and two electrical conductors may be fed from spools, bins, and/or reels. The dielectric film 130 may be positioned between the two conductor's such that the dielectric film 130 extends beyond at least one of the two conductors, and the two conductors may be helically twisted together. As a result, the dielectric film 130 may be woven helically into a twisted pair 105. The resulting twisted pair 105 may then be combined with a wide variety of other cable components, such as other twisted pairs. As desired, one or more shield layers may be wrapped around the twisted pair 105 and/or desired grouping of twisted pairs. For example, a shield tape may be fed from a bin, spool, or reel and folded about one or more twisted pairs during a cabling process. As desired, one or more separators or separation elements may also be combined during a cabling process. An outer jacket may then be extruded over the cable components.

In certain embodiments, a suitable adhesive may be deposited or formed on the dielectric film 130 in order to bond the conductors of a twisted pair and the dielectric film 130. For example, a pressure sensitive adhesive (e.g., glue, etc.) or a hot melt adhesive (e.g., a thermoplastic, an elastomer, an elastomeric material, a thermoplastic elastomer, synthetic rubber, latex rubber, silicone rubber, silicone polyurethane, silicone, acrylic rubber, etc.) may be applied to the dielectric film 130 during assembly of a twisted pair 105, and the conductors of the twisted pair 105 may be brought into contact with the adhesive. In certain embodiments, the adhesive may be applied in-line as twisted pair 105 is assembled. In certain embodiments, the adhesive may hold the twisted pair components in place during construction of the cable 100 (e.g., prior to formation of the outer jacket 115), during storage, shipment, and installation of the cable 100 (e.g., as the cable 100 is drawn through a duct, etc.), and/or following installation of the cable 100 (e.g., as mechanical stress is exerted on a buried cable, etc.).

As a result of providing dielectric films 130A-D or separation elements that extend beyond the twisted pairs, a suitable separation distance may be maintained between one or more twisted pairs 105A-D and one or more shield components. For example, a suitable separation distance may be maintained between a twisted pair 105 and a shield that is wrapped around the twisted pair 105, such as an individual pair shield 120. As another example, a suitable separation distance may be maintained between a twisted pair 105 and a filler or separator 110 that is positioned between two or more twisted pairs. Additionally, in certain embodiments, the separation distance may be filled with air (or another suitable gas) having a relatively low dielectric constant, thereby decreasing attenuation and/or electrical losses within the cable 100.

Further, the use of dielectric films 130A-D or separation elements may permit the size of cables to be reduced relative to conventional shielded cables. In particular, the thickness of twisted pair insulation (i.e., the insulation for each electrical conductor included in a twisted pair) may be reduced, thereby resulting in reduced cable thickness and/or lower cable costs. By contrast, conventional shielded cables typically utilize relatively thicker solid and/or foamed polymers as twisted pair insulation in order to maintain a desired separation between twisted pair conductors and a shield. These materials often increase overall cable size and cost, while providing a dielectric that is less effective than air.

Although generally referred to herein as a dielectric film 130, any desired separation element may be incorporated into a twisted pair 105. These separation elements may include, but are not limited to, a wide variety of films, tapes, dielectric separators, and/or other suitable separation components. The term dielectric film has been utilized for ease of understanding various embodiments of the disclosure and is not intended to be limiting.

As desired in various embodiments, a wide variety of other materials may be incorporated into the cable 100. For example, as set forth above, the cable 100 may include any number of conductors, twisted pairs, optical fibers, and/or other transmission media. In certain embodiments, one or more tubes or other structures may be situated around various transmission media and/or groups of transmission media. Additionally, as desired, a cable may include a wide variety of strength members, swellable materials (e.g., aramid yarns, blown swellable fibers, etc.), insulating materials, dielectric materials, flame retardants, flame suppressants or extinguishants, gels, and/or other materials.

The cable 100 illustrated in FIG. 1 is provided by way of example only. Embodiments of the disclosure contemplate a wide variety of other cables and cable constructions. These other cables may include more or less components than the cable 100 illustrated in FIG. 1. Additionally, certain components may have different dimensions and/or materials than the components illustrated in FIG. 1.

Figure 2:
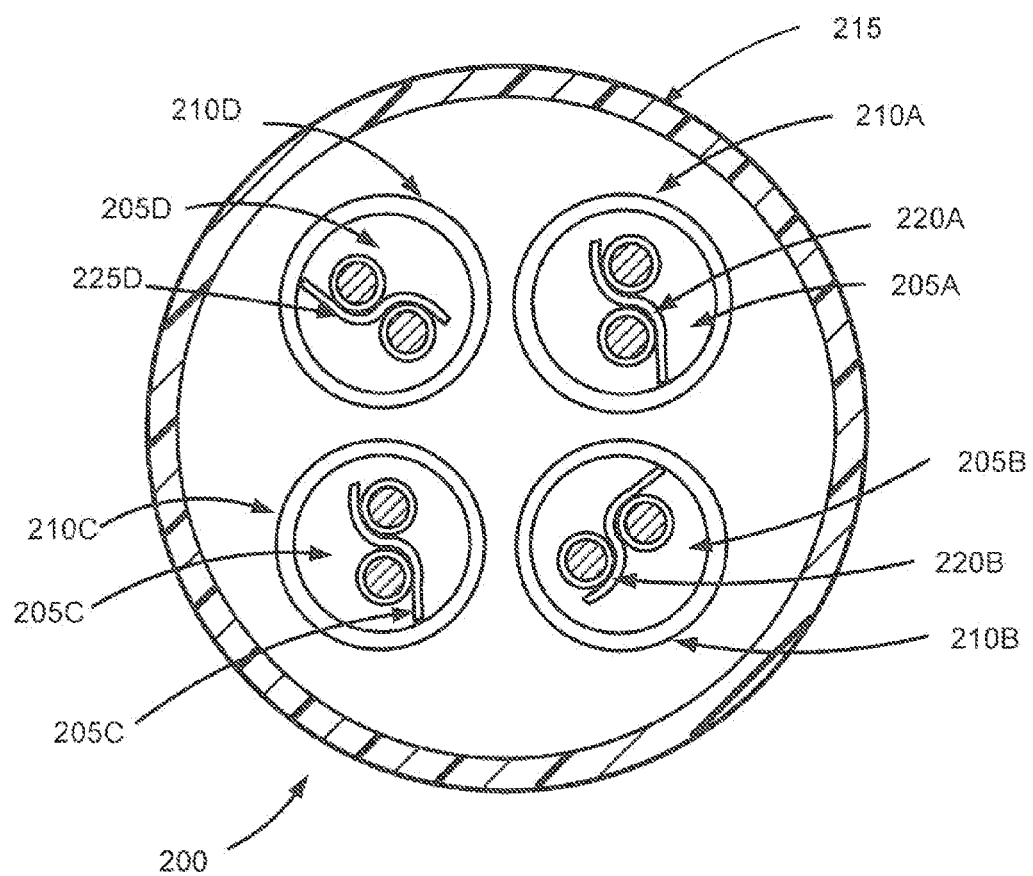

FIG. 2 is a cross-sectional view of another example shielded twisted pair communication cable 200, according to an illustrative embodiment of the disclosure. The cable 200 of FIG. 2 may include certain components that are similar to the cable 100 illustrated and described above with reference to FIG. 1. Accordingly, the cable 200 may include a plurality of twisted pairs 205A-D disposed in a cable core. Additionally, each of the twisted pairs 205A-D may be individually shielded. For example, respective shield layers 210A-D may be formed around each of the twisted pairs 205A-D. An outer jacket 215 may enclose the internal components of the cable 200.

In contrast to the cable 100 illustrated in FIG. 1, the cable 200 of FIG. 2 does not include either a separator or an external shield. Additionally, each of the dielectric films 220A-D positioned between the individual conductors of a respective twisted pair 205A-D are illustrated as only extending beyond the twisted pair 205A-D at or along a single edge. In other words, at the illustrated cross-sectional point, each dielectric turn 220A-D extends beyond a circumference or periphery of an applicable twisted pair 205A-D at only one of two edges along a widthwise dimension of the dielectric film 220A-D.

Figure 3:
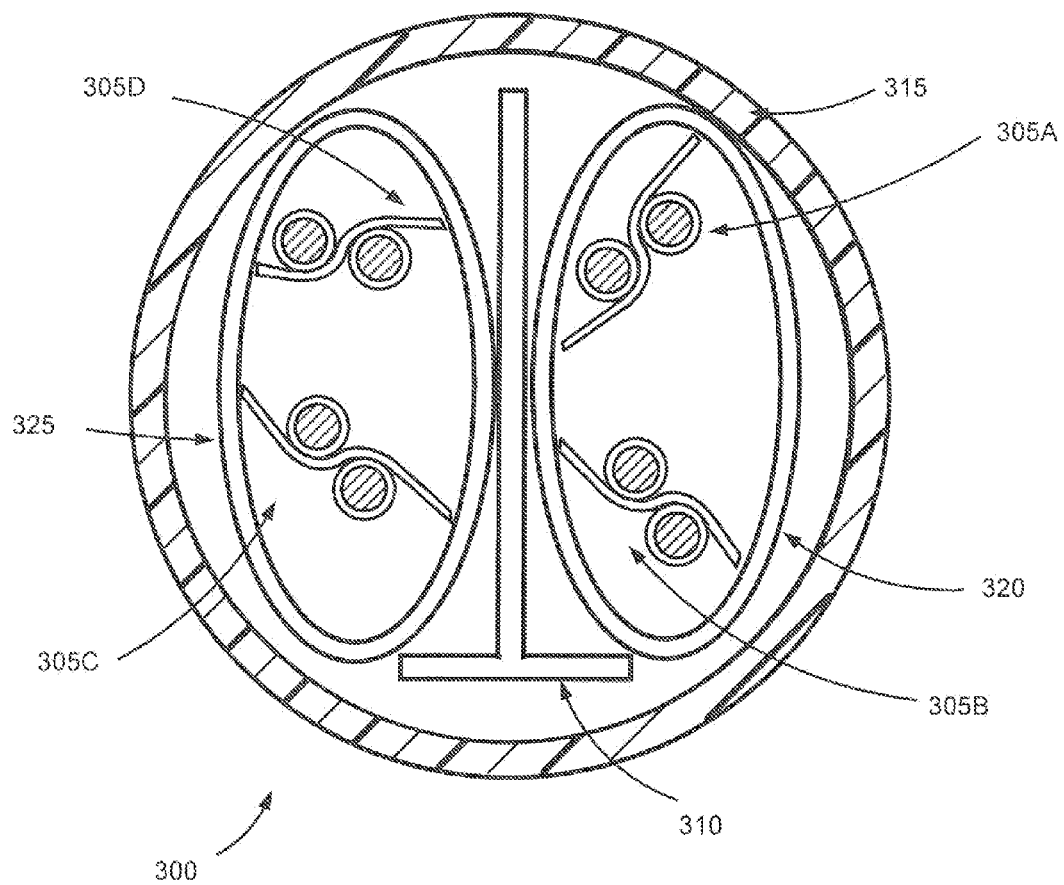

FIG. 3 is a cross-sectional view of another example shielded twisted pair communication cable 300, according to an illustrative embodiment of the disclosure. The cable 300 of FIG. 3 may include certain components that are similar to the cable 100 illustrated and described above with reference to FIG. 1. Accordingly, the cable 300 may include a plurality of twisted pairs 305A-D disposed in a cable core. A separator 310 may be disposed between at least two of the twisted pairs 305A-D and may function to orient and/or provide desired spacing between two or more of the twisted pairs 305A-D. In certain embodiments, the separator 310 may also include patches of electrically conductive material that provide shielding The separator 310 illustrated in FIG. 3 has a different construction than the separators 110, 210 illustrated in FIGS. 1 and 2. In particular, the separator 310 is a generally T-shaped separator that approximately bisects (or otherwise divides) the cable core and forms two channels along a longitudinal length of the cable 300 in which the twisted pairs 305A-D are disposed. For example, two twisted pairs 305A, 305B can be disposed in a first channel and the remaining two twisted pairs 305C, 305D can be disposed in a second channel. The T-shaped separator 310 illustrated in FIG. 3 is merely one example of an alternative separator shape, and a wide variety of other separator shapes and/or configurations may be utilized.

With continued reference to FIG. 3, an outer jacket 315 may enclose the internal components of the cable 300. Additionally, any number of shield layers may be utilized to provide shielding for the twisted pairs 305A-D. For example, a first shield layer 320 may be wrapped or otherwise formed around two of the twisted pairs, such as the twisted pairs 305A, 305B disposed in the first channel. A second shield layer 325 may be wrapped or otherwise formed around other twisted pairs, such as twisted pairs 305C, 305D disposed in the second channel. In other words, shield layers may be provided for various groups of twisted pairs disposed within the cable core.

Further, respective dielectric films 330A-D may be positioned between the individual conductors of the twisted pairs 305A-D. Similar to the dielectric films 130A-D illustrated in FIG. 1, each dielectric film 330A-D is illustrated as extending beyond a respective twisted pair 305A-D along both a first and a second widthwise edge. As a result, the dielectric films 330A-D may maintain a suitable separation distance between the twisted pairs 305A-D and the shield layers 320, 325. For example, the first and second dielectric films 330A, 330B may maintain a suitable separation distance between the first and second twisted pairs 305A, 305B and the first shield layer 320. Similarly, the third and fourth dielectric films 330C, 330D may maintain a suitable separation distance between the third and fourth twisted pairs 305A, 305B and the second shield layer 325.

FIG. 4 is a cross-sectional view of yet another example shielded twisted pair communication cable 400, according to an illustrative embodiment of the disclosure. The cable 400 of FIG. 4 may include certain components that are similar to the cable 100 illustrated and described above with reference to FIG. 1. Accordingly, the cable 300 may include a plurality of twisted pairs 405A-D disposed in a cable core. A separator 410 may be disposed between at the twisted pairs 405A-D and may function to orient and/or provide desired spacing between two or more of the twisted pairs 405A-D. In certain embodiments, the separator 410 may also include patches of electrically conductive material that provide shielding between the twisted pairs 405A-D. Additionally, an external shield 415 may be formed around the twisted pairs 405A-D and the separator 410. An outer jacket 420 may then be formed around the other cable components.

In certain embodiments, both the separator 410 and the external shield 415 may include one or more patches of electrically conductive material. In this regard, the performance of the cable 400 may be similar to a cable in which each of the twisted pairs 405A-D is individually shielded (i.e., a shielded twisted pair ("STP") cable). In other words, the cable 400 may function as an alternative to conventional STP cables. However, the cable 400 may be easier to terminate by a technician. Additionally, respective dielectric films 425A-D may be disposed between the individual conductors of each of the twisted pairs 405A-D. Each of the dielectric films 425A-D may extend beyond its respective twisted pair 405A-D, thereby maintaining a suitable separation distance between the twisted pair 405A-D and the shielding elements (e.g., the separator 410, the external shield 415) of the cable 400.

Similar to the cable 100 illustrated in FIG. 1, the cables 200, 300, 400 illustrated in FIGS. 2-4 are provided by way of example only. Embodiments of the disclosure contemplate a wide variety of other cables and cable constructions. These other cables may include more or less components than the cables 200, 300, 400 illustrated in FIGS. 2-4. For example, other cables may include alternative shielding arrangements and/or different types of separators or fillers. Other cables may also include alternative numbers and/or configurations of dielectric films. Additionally, certain components may have different dimensions and/or materials than the components illustrated in FIGS. 2-4.

Figure 5A:
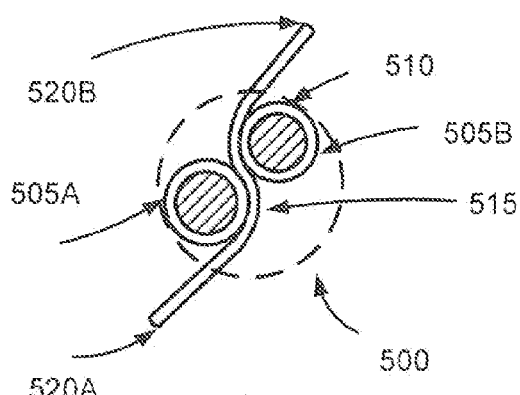
FIGS. 5A-5E are cross-sections of example twisted pairs and dielectric film separators that may be utilized in accordance with various embodiments of the disclosure.

A wide variety of different types of dielectric films or dielectric separators may be utilized as desired in various embodiments of the disclosure. These dielectric separators may include any suitable dimensions and/or shapes. FIGS. 5A-5E illustrate cross-sectional views of example twisted pairs and dielectric film separators that may be utilized in accordance with various embodiments of the disclosure. Turning first to FIG. 5A, a first example twisted pair 500 is illustrated. The twisted pair 500 may include two individually insulated conductive elements 505A, 505B that are twisted together. When twisted, the two conductive elements 505A, 505B may occupy a cross-sectional area along a length of a cable that is approximately represented by dashed line 510. Accordingly, the dashed line 510 may represent an outer periphery or circumference of the twisted pair 500 when incorporated into a cable.

Additionally, a dielectric separator 515, such as a dielectric film, may be positioned between the two conductive elements 505. According to an aspect of the disclosure, the dielectric separator 515 may extend beyond the twisted pair 500. In other words, the dielectric separator 515 may extend beyond the outer periphery of the twisted pair 500 represented by the dashed line 510. As shown in FIG. 5A, the dielectric separator 515 may extend beyond the twisted pair 500 at a plurality of edges, such as a first edge 520A and a second edge 520B. Assuming that the dielectric separator 515 is initially formed as a relatively flat separator, the edges 520A, 520B may be edges along a width dimension of the dielectric separator 515. When woven into the twisted pair 500, a length dimension of the dielectric separator 515 may extend along a longitudinal direction of the twisted pair 500 that is approximately transverse to the illustrated cross-section.

Figure 5B:
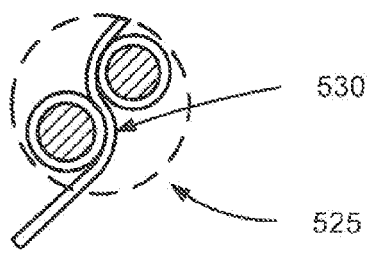

FIG. 5B illustrates a second example twisted pair 525 and associated dielectric separator 530. Similar to the dielectric separator 515 of FIG. 5A, the dielectric separator 530 of FIG. 5B may include a first and second edge; however, only one of the two edges may extend beyond the twisted pair 525. In other words, only a single edge of the dielectric separator 530 may extend beyond an outer periphery of the twisted pair 525.

Figure 5C:
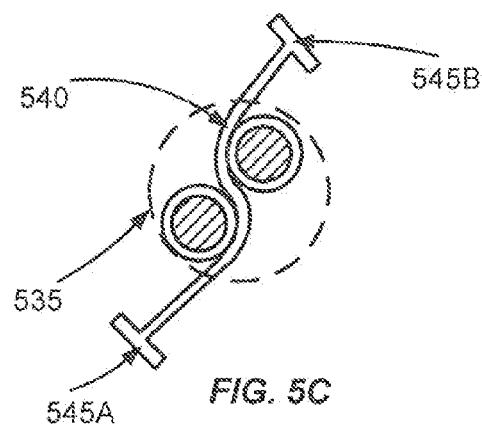

FIG. 5C illustrates a third example twisted pair 535 and associated dielectric separator 540. The dielectric separator 540 illustrated in FIG. 5C extends beyond the twisted pair 535 at both a first and second edge. Additionally, each of the edges is illustrated as including an approximately T-shaped end portion 545A, 545B. The T-shaped end portions 545A, 545B may function to maintain a suitable separation distance between the twisted pair 535 and other cable components, such as various shielding elements. For example, a T-shaped end portion may contact a shield layer and assist in maintaining a suitable distance between the shield layer and the twisted pair 535.

Additionally, a wide variety of suitable techniques may be utilized to form a dielectric separator 540 with one or more T-shaped end portions. For example, a flat tape dielectric separator may be folded a one or more ends to form one or more T-shaped end portions. As one example, a tape may extend in a first direction that may be equated to the vertical portion of a "T". The tape may then be folded in at an approximately ninety-degree angle to form one half of the horizontal portion of the "T". The tape may then be folded over itself at an approximately 180 degree angle in order to form the other half of the horizontal portion of the "T". In another example embodiment, a dielectric separator may be molded to include one or more T-shaped end portions.

Figure 5D:
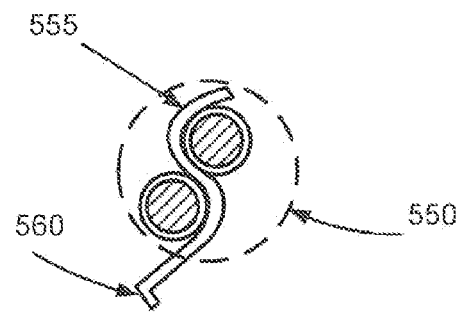

FIG. 5D illustrates a fourth example twisted pair 550 and associated dielectric separator 555. The dielectric separator 555 illustrated in FIG. 5D extends beyond the twisted pair 550 at a single edge. In other embodiments, the dielectric separator 555 may extend beyond the twisted pair 550 at both a first and second edge. Additionally, the extending edge of the dielectric separator 555 may include an approximately L-shaped end portion 560. The L-shaped end portion 560 may function to maintain a suitable separation distance between the twisted pair 550 and other cable components, such as various shielding elements. Additionally, similar to the dielectric separator 540 discussed above with reference to FIG. 5C, a wide variety of suitable techniques may be utilized to form the L-shaped end portion 560. Further, in other embodiments, dielectric separators may include a wide variety of other suitable end portions, such as an approximately J-shaped end portion.

Figure 5E:
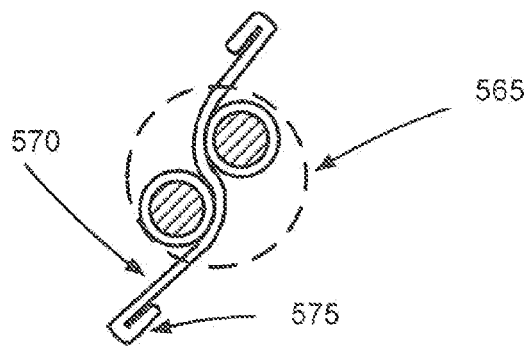

FIG. 5E illustrates a fifth example twisted pair 565 and associated dielectric separator 570. The dielectric separator 570 is illustrated as extending beyond the twisted pair 565 at both a first and second edge. Additionally, at least one of the edges may include an end portion 575 that is folded over itself. For example, the dielectric separator 570 may be folded over itself at an approximately 180 degree angle such that the separator 570 extends back towards the twisted pair 565. In this regard, a portion of the dielectric separator 570 positioned beyond the twisted pair 565 may be thicker than a portion of the separator 570 positioned between the two conductors of the twisted pair 565. Alternatively, a dielectric separator could be molded or otherwise formed to include a relatively thicker portion positioned beyond the twisted pair 565.

A wide variety of other dielectric separators may be utilized as desired in various embodiments. These dielectric separators may include dimensions and/or configurations other than those illustrated in FIGS. 5A-5E. Indeed, the dielectric separators illustrated in FIGS. 5A-5E are provided by way of non-limiting example only.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable, comprising:
 a twisted pair of insulated conductors, wherein an outer circumference is defined by the twisted pair along a longitudinal length of the cable;
 a shield formed around the twisted pair;
 a dielectric film separating the insulated conductors of the twisted pair, the dielectric film extending beyond the outer circumference of the twisted pair by a distance of at least approximately the diameter of one of the insulated conductors and said dielectric film comprising an end portion having a "T" or "L" cross-sectional shape that contacts the shield; and
a jacket formed around the shield.

2. The cable of claim 1, wherein the dielectric film separates the insulated conductors along a width dimension having a first edge and a second edge, and
wherein both the first edge and the second edge extend beyond the outer circumference.

3. The cable of claim 1, wherein the dielectric film separates the insulated conductors along a width dimension having a first edge and a second edge, and
wherein one of the first edge or the second edge extends beyond the outer circumference.

4. The cable of claim 1, wherein the twisted pair comprises one of a plurality of twisted pairs of insulated conductors, and
wherein the shield comprises an individual shield formed around the twisted pair.

5. The cable of claim 1, wherein the twisted pair comprises one of a plurality of twisted pairs of insulated conductors, and
wherein the shield is formed around the twisted pair and at least one other twisted pair included in the plurality of twisted pairs.

6. The cable of claim 5, wherein the dielectric film comprises a first dielectric film, and further comprising:
a second dielectric film separating the insulated conductors of the at least one other twisted pair, the second dielectric film extending beyond an outer circumference of the at least one other twisted pair.

7. A cable, comprising:
a twisted pair of electrical conductors;
a shield formed around the twisted pair;
a dielectric separator positioned between the electrical conductors of the twisted pair, the dielectric separator extending beyond the twisted pair and comprising an end portion having a "T" or "L" cross-sectional shape that contacts the shield, wherein a separation distance between the shield and the twisted pair is maintained by the dielectric separator; and
a jacket formed around the shield.

8. The cable of claim 7, wherein the dielectric separator comprises a first edge and a second edge along a width dimension, and
wherein both the first edge and the second edge extend beyond the twisted pair.

9. The cable of claim 7, wherein the dielectric separator comprises a first edge and a second edge along a width dimension, and
wherein one of the first edge or the second edge extends beyond the twisted pair.

10. The cable of claim 7, wherein the twisted pair comprises a first twisted pair, the shield comprises a first shield, and further comprising:
a second twisted pair of electrical conductors; and
a second shield formed around the second twisted pair.

11. The cable of claim 7, wherein the twisted pair comprises a first twisted pair, and further comprising:
a second twisted pair of electrical conductors,
wherein the shield is formed around the first twisted pair and the second twisted pair.

12. The cable of claim 11, wherein the dielectric separator comprises a first dielectric separator, and further comprising:
a second dielectric separator positioned between the electrical conductors of the second twisted pair and extending beyond the second twisted pair.

13. The cable of claim 7, wherein the dielectric separator extends beyond the twisted pair by a distance of at least approximately the diameter of one of the electrical conductors.

14. A cable, comprising:
a plurality of twisted pairs of conductive elements;
a plurality of shield layers, each shield layer formed around a respective one of the plurality of twisted pairs;
a plurality of dielectric films, each dielectric film positioned between the conductive elements of a respective twisted pair and extending beyond the twisted pair to provide separation between the twisted pair and its respective shield layer, wherein each dielectric film further comprises an end portion having a "T" or "L" cross-sectional shape that contacts the respective shield layer; and
a jacket formed around the plurality of twisted pairs and the plurality of shield layers.

15. The cable of claim 14, wherein each dielectric film comprises a first edge and a second edge along a width dimension, and
wherein both the first edge and the second edge extend beyond the twisted pair.

16. The cable of claim 14, wherein each dielectric film comprises a first edge and a second edge along a width dimension, and
wherein one of the first edge or the second edge extend beyond the twisted pair.

17. A cable, comprising:
a plurality of twisted pairs of conductive elements;
a separator positioned between at least two of the plurality of twisted pairs, the separator comprising one or more sections of electrically conductive material;
a dielectric film separating the conductive elements of one of the twisted pairs, the dielectric film extending beyond an outer circumference of the twisted pair and comprising an end portion having a "T" or "L" cross-sectional shape that contacts the separator to maintain a separation distance between the twisted pair and the separator; and
a jacket formed around the plurality of twisted pairs and the separator.

18. The cable of claim 17, further comprising a shield formed around the plurality of twisted pairs and the separator, wherein the dielectric film maintains separation between the twisted pair and the shield.

19. The cable of claim 17, wherein the dielectric film comprises a first edge and a second edge along a width dimension, and
wherein at least one of the first edge or the second edge extends beyond the twisted pair.

* * * * *